United States Patent [19]

Crain

[11] 4,395,995
[45] Aug. 2, 1983

[54] CIRCULATING FUEL HEATING SYSTEM FOR INTERNAL COMBUSTION ENGINES

[76] Inventor: Theron H. Crain, Rte. 7, Box 164-B, Muskogee, Okla. 74401

[21] Appl. No.: 284,527

[22] Filed: Jul. 17, 1981

Related U.S. Application Data

[63] Continuation-in-part of Ser. No. 241,585, Mar. 9, 1981.

[51] Int. Cl.³ ............................................. F02M 31/00
[52] U.S. Cl. .................................... 123/557; 123/514; 123/516
[58] Field of Search ............... 123/552, 557, 514, 516, 123/518

[56] References Cited

U.S. PATENT DOCUMENTS

| | | | |
|---|---|---|---|
| 2,599,699 | 6/1952 | Dilworth | 123/516 |
| 3,986,486 | 10/1976 | Rabbiosi | 123/557 |
| 4,072,138 | 2/1978 | Hawkins | 123/557 |
| 4,146,002 | 3/1979 | Quinn | 123/557 |
| 4,180,036 | 12/1979 | Wolf | 123/557 |
| 4,248,197 | 2/1981 | Davis | 123/557 |
| 4,285,316 | 8/1981 | Stolz | 123/514 |

FOREIGN PATENT DOCUMENTS 2324888 4/1977 France ............................ 123/516

Primary Examiner—Ronald H. Lazarus
Attorney, Agent, or Firm—Head, Johnson & Stevenson

[57] ABSTRACT

An improved circulating fuel heating system for internal combustion engines of both gas and diesel types. The system is sizeable through staged heat exchanger components to provide the necessary fuel heating for various engine sizes and fuel consumption rates in order to maintain the temperature of the fuel entering the carburetor bowl to just above the temperature of vaporization for the fuel. The system basically comprises a plurality of staged fuel/hot water heat exchangers, a fuel controller interposed between the heat exchanger and the carburetor bowl, a hot water control valve operably connected to a temperature sensor in the controller to control the flow of hot water through the heat exchanger and hence, the temperature of the fuel entering the controller, and a second fresh air fuel/exhaust manifold heat exchanger constructed as a part of the controller to satisfy initial heating requirements for the fuel for a period after cold engine starting and for events of undersizing of the staged hot water heat exchanger.

13 Claims, 23 Drawing Figures

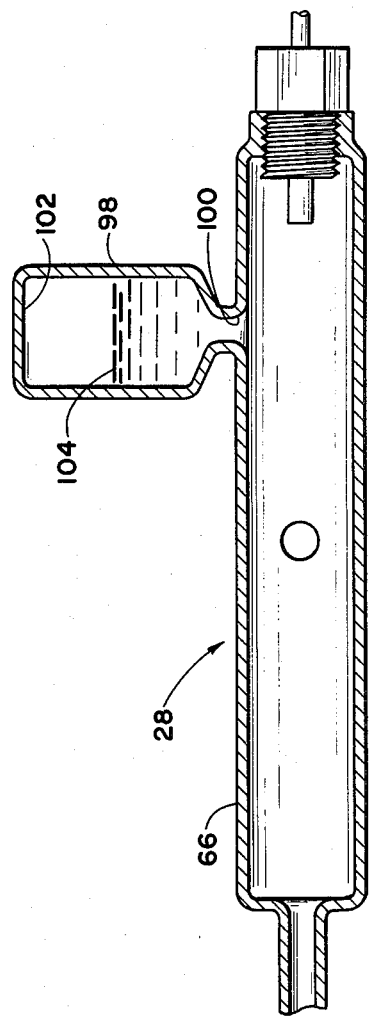
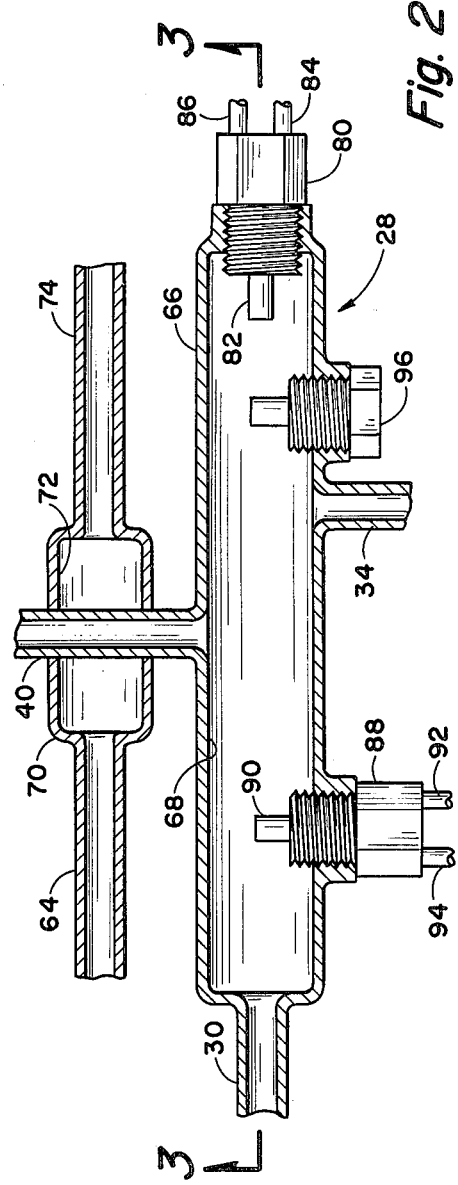

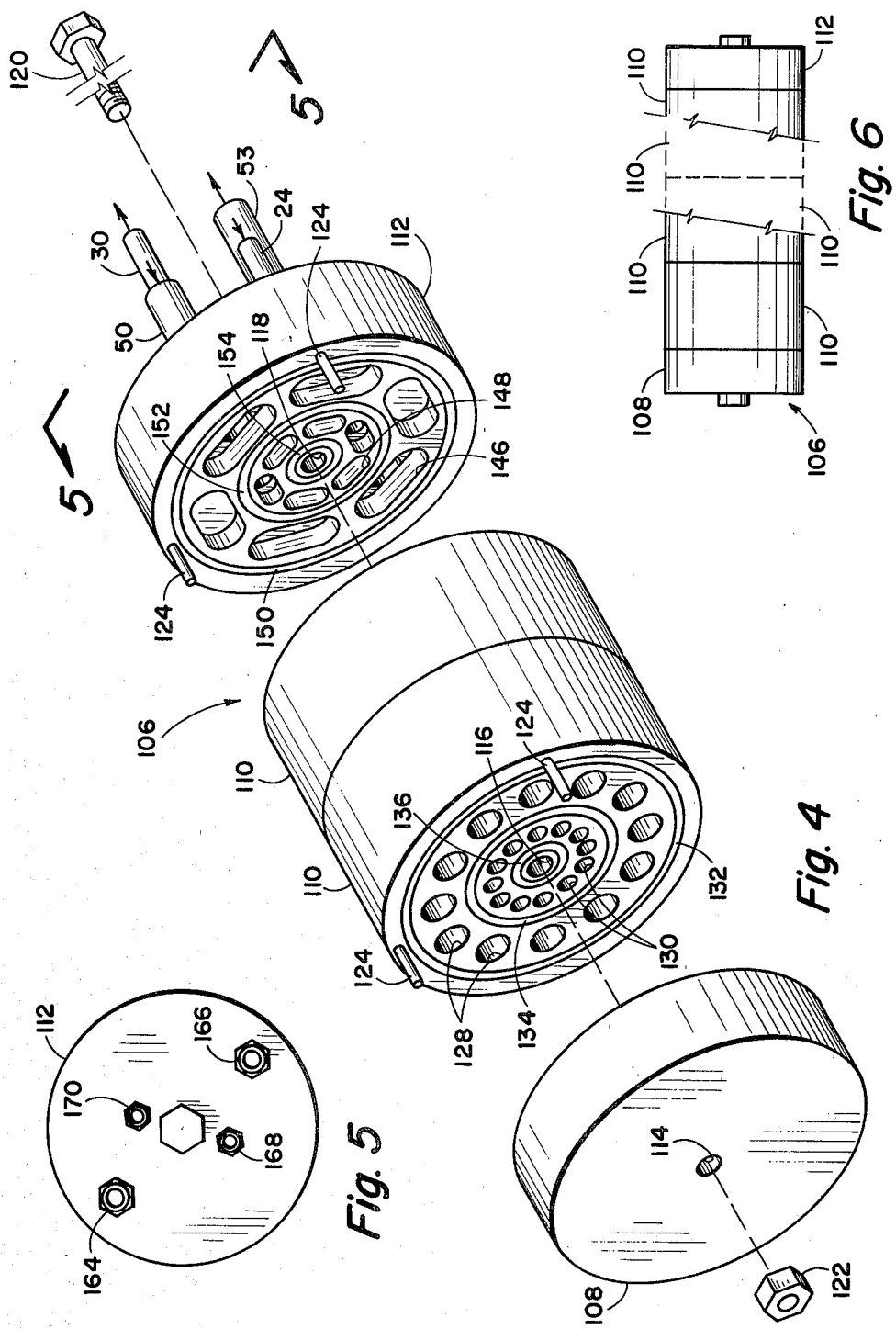

CIRCULATING FUEL HEATING SYSTEM FOR INTERNAL COMBUSTION ENGINES

CROSS REFERENCES

This is a continuation-in-part of Applicant's pending application Ser. No. 241,585, filed on the 9th day of Mar., 1981, for a "Circulating Fuel Heating System For Internal Combustion Engines."

BACKGROUND OF THE INVENTION

1. Field of the Invention

The present invention relates to a fuel heating system for internal combustion engines and more particularly, but not by way of limitation, to a continuous circulating fuel heating system for raising and maintaining fuel temperature to its vaporization temperature at the introduction to the carburetor.

2. History of the Prior Art

It has long been recognized that increased fuel economy can be realized if the temperature of the fuel, prior to entering the carburetor, can be raised to its vaporization temperature so that upon encountering the low pressure in the carburetor barrel, it completely vaporizes providing more complete combustion and hence, providing more efficient power conversion.

Since it is necessary to keep such heated fuel systems under pressure to maintain the fuel in the desired liquid state prior to entering the carburetor, the previous systems included a fuel pressure regulator interposed in the line connecting the hot fuel supply to the carburetor as taught in the patent to Furr et al, U.S. Pat. No. 4,083,340 issued Apr. 11, 1978 and entitled "Gasoline Superheater."

The primary disadvantages of such systems is that they are unable to rapidly adjust to different fuel flow rates needed when changing engine speed and hence, fuel demands.

For example, when the engine speed is high or under laboring conditions, the fuel flows rapidly through the regulator providing heated fuel to the carburetor, however, during slow driving or idle when the engine is not laboring, the fuel demand is less and fuel therefore backs up in the line between the pressure regulator and the heat exchanger and, hence, cooling of the fuel occurs. When high fuel demand resumes, this cool fuel is supplied to the carburetor, shortly thereafter followed by superheated fuel which causes the mixture to be constantly fluctuating leading to inefficient and rough engine operation.

Further, if the superheater of the Furr et al patent is properly sized for typical fuel consumption, it may be inadequate during periods of great fuel demand.

SUMMARY OF THE PRESENT INVENTION

The present invention provides a circulating fuel heating system for providing a continuous supply of heated fuel to the carburetor regardless of the level of the fuel demand to substantially maintain the heat in the carburetor bowl to vaporization temperature.

The present system comprises a plurality of stacked hot water heat exchangers which utilize the heat provided by the vehicle hot water circulating system to the heater. The number of stacked exchanger units is dictated by engine size and fuel consumption rates. Naturally, a practical consideration is the available space under the hood of the vehicle.

The stacked heat exchangers taught in the present invention comprise at least one cylindrical body member constructed of thermal conductive material, such as aluminum, having a first plurality of parallel fluid passageways arranged in a circular pattern for the passing of hot water therethrough and a second plurality of parallel passageways therethrough, also arranged in a circular pattern and concentric with the first passageways for the passing of fuel therethrough.

One or more of these cylindrical body members may be joined together in an end-to-end fashion to effectively extend the length of the passageways for the fuel and water traveling therethrough.

The cylindrical body members, after being joined together, are provided with oppositely disposed end plates or header plates having hot water and fuel inlet and outlet ports in communication with the passageways in the body member or members. In order to route the fuel through the passageways, each end plate is provided with a plurality of cavity grooves on the inner face thereof, which are positioned to provide open communication between adjacent pairs of the fluid passageways. The fluid inlet and outlet ports then are connected through the end plates into communication with oppositely disposed cavities so that when a fluid, either hot water or fuel, is passed into one of the cavities, the flow divides and passes through adjacent passageways. Upon reaching the opposite end plate, the cavities are staggered in order to route the fuel back along the next adjacent passageways so that the fluid passes through all of the passageways and exits the opposite cavity having a fluid outlet port.

Therefore, if the heat exchanger is constructed with one-half of the number of hot water passageways being an even number, hot water may be inserted into one end plate and extracted from the opposite side of that same end plate after the water has been split and passed through all of the hot water passageways. On the other hand, if half the number of passageways is an odd number, hot water may be inserted in one end plate and extracted out of the other end plate. The same is true of the fuel inlet and outlet ports thereby allowing a few basic configurations of the heat exchanger elements to fit into the configuration of the available space under the hood of most presently manufactured automobiles or trucks. It is desirable to have the heat exchanger located in a near proximity to the carburetor.

A fuel controller is connected between the heat exchanger and the carburetor fuel bowl to provide a constant supply of fuel to the carburetor. The temperature of the fuel in the controller is maintained constantly by way of a hot water control valve operably connected to a preset temperature sensor in the controller. A second outlet of the controller is connected back to a metering valve which, in turn, is connected back into the fuel line upstream of the fuel pump or pumps. Therefore, fuel is constantly circulating through the heat exchangers and the controller regardless of engine demands. This provides the further advantage of not allowing the fuel to return to the normally colder fuel tank.

During cold-start conditions, a fresh-air exhaust manifold heat exchanger provides heat to the controller to improve efficiency before the hot water exchangers have brought the fuel up to operating temperature. The flow of hot air through the exhaust manifold heat exchanger is provided by a vacuum valve and sensor located in the controller so that, should the fuel flow demands or the outside temperature render the hot water heat exchanger of insufficient size to maintain the desired temperature, the exhaust manifold heat exchanger automatically comes into operation to help provide the necessary heat for maintaining the fuel at vaporization temperature.

Further, fuel line expander chambers are provided upstream of the system to prevent already heated fuel from backing up along the fuel lines into the fuel tank thereby avoiding needless loss of fuel temperature during periods of low fuel consumption, during engine idle or low running power conditions.

Therefore, although the present fuel circulating system requires more heat than a direct-line heating system, greater efficiency is obtained by maintaining a constant supply of high-temperature fuel to the carburetor regardless of engine operating conditions.

DESCRIPTION OF THE DRAWINGS

Other and further advantageous features of the present invention will hereinafter more fully appear in connection with a detailed description of the drawings in which:

FIG. 2 is a top plan sectional view of the fuel controller of the present invention.

FIG. 3 is an elevational sectional view of the controller of FIG. 2 taken along the broken lines 3—3 of FIG. 2.

FIG. 4 is an exploded prospective view of a multiple stage heat exchanger embodying the present invention.

FIG. 5 is an end view of the heat exchanger of FIG. 4.

FIG. 6 is a schematic view of a multiple stage heat exchanger embodying the present invention.

DESCRIPTION OF THE PREFERRED EMBODIMENTS

Figure 1:
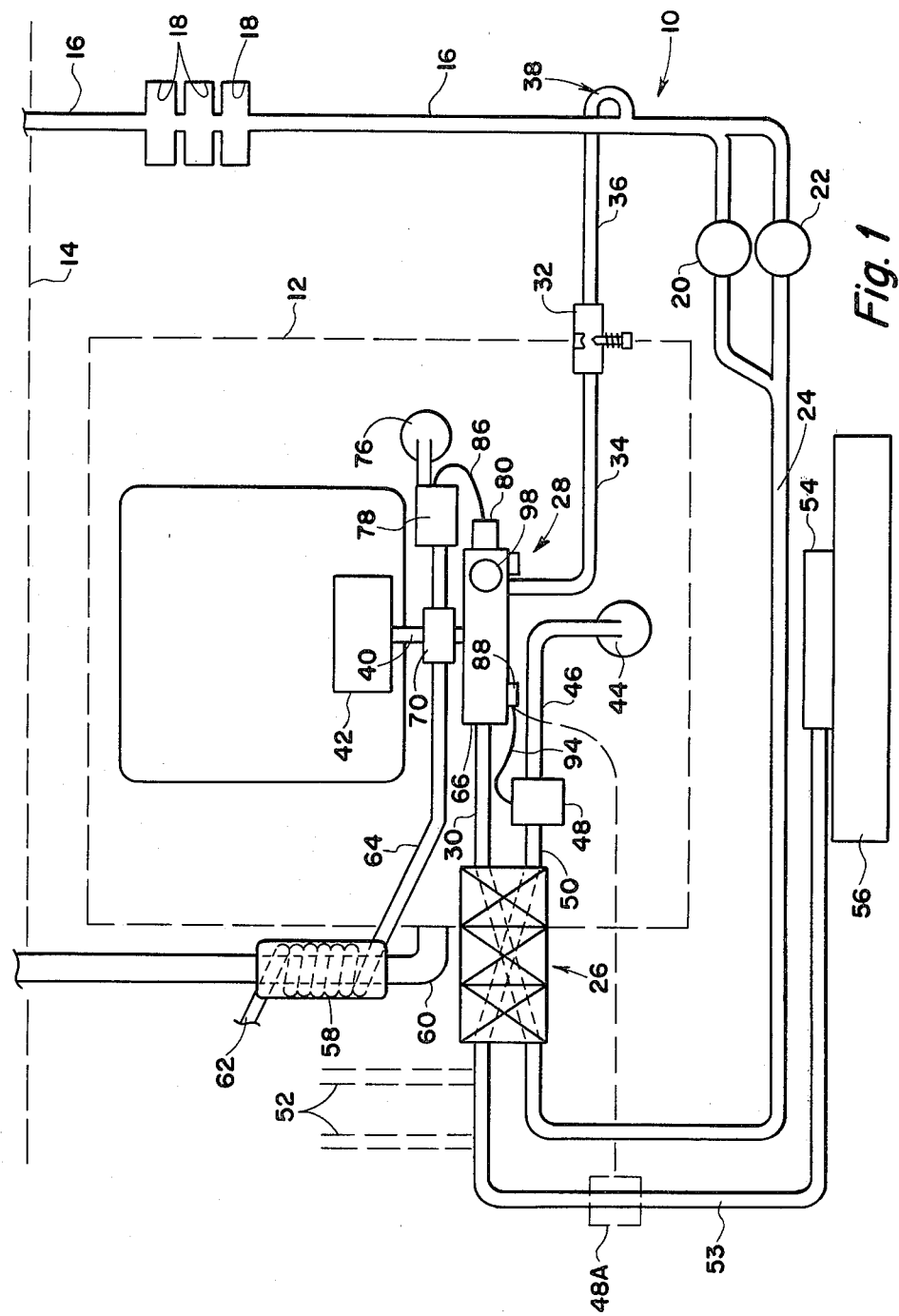
FIG. 1 is a schematic flow diagram of a circulating fuel heating system embodying the present invention.

Referring to the drawings in detail, and particularly to FIGS. 1, 2 and 3, reference character 10 generally indicates a circulating fuel heater system operably connected to an internal combustion engine indicated by reference character 12. The engine 12 is of a typical internal combustion type for the conversion of either gasoline or diesel fuel into mechanical energy. Reference character 14 generally indicates schematically the fire wall of the engine compartment having an inlet fuel line 16 which is connected to a remotely positioned fuel tank (not shown). It is noted at this point that the placement of the components shown in the drawing of FIG. 1 may vary considerably depending on the design of the engine compartment.

The fuel line 16 is provided with a plurality of expander compartments 18 which have the effect of simply enlarging the volume of the fuel capacity in the lines forward of the fire wall to prevent significant backflow. The fuel line is then provided with a pair of parallel-operated fuel pumps 20 and 22, one or both of which may be of the electrical positive displacement type fuel pump.

Reference character 24 represents the fuel line downstream of the fuel pumps 20 and 22 and serves to pass the fuel through a staged heat exchanger generally indicated by reference character 26 which will be hereinafter more fully described. The fuel from the heat exchanger 26 is then provided to a controller generally indicated by reference character 28 via a line 30.

Unused fuel passes from the fuel controller 28 through a fuel metering valve 32 by way of fuel line 34. After the fuel leaves the metering valve 32 it is passed through a fuel line 36 and into the fuel line 16 through a J-fitting 38 upstream of the fuel pumps 20 and 22. Fuel also passes from the controller 28 through a line 40 into a carburetor bowl 42 in a manner that will be hereinafter set forth.

It is noted at this point that some engines have a fuel return system, such as diesels where a fuel injection system is used. It may be possible on some such engines to utilize the fuel return system already in place thereby eliminating the need for the fuel return elements 32, 34, 36 and 38 hereinbefore described.

Hot water from the engine is provided from a port 44 through a line 46 to a vacuum-operated shut off valve 48. The shut off valve 48 is, in turn, operably connected to the heat exchanger 26 by way of a hot water line 50. The hot water from the heat exchanger 26 then passes either to the vehicle heater system (not shown) via lines 52 or directly back to the vehicle water pump 54 where it is cooled by way of the radiator 56 and subsequently circulated back through the engine where it again picks up heat from the engine.

It is noted at this point that the vacuum-operated shut off valve 48 may be placed in the water line 53 downstream of the heat exchanger 26 as indicated by reference character 48a.

A second fresh-air heat exchanger 58 is operably connected to the vehicle exhaust manifold 60. The exchanger 58 has a fresh-air inlet port 62, the fresh air outlet thereof being operably connected to the controller 28 by way of air line 64 in a manner that will be hereinafter set forth.

Referring to FIGS. 2 and 3 of the drawings, the fuel controller 28 comprises a cylindrical housing 66, the interior 68 thereof forming a chamber for the receipt of fuel from the heat exchanger 26 via the line 30. The controller further comprises a second fuel heat exchanger 70 which operates in conjunction with the carburetor inlet line 40. The heat exchanger 70 provides a chamber 72 which is operably connected to the heated fresh air output of the heat exchanger 58 hereinbefore described via the line 64. The fuel line 40 passes through the chamber to provide heating of the fuel in the line 40 as will be hereinafter set forth.

The heat exchanger 70 also comprises a fresh air outlet line 74 which is operably connected to a vacuum source 76 through a vacuum operated valve 78. A first temperature sensor 80 is operably connected by way of a sensor element 82 to the interior 68 of the fuel controller chamber 66. The sensor 80 comprises two vacuum lines 84 and 86, one said vacuum line being operably connected to a vacuum source, the opposite vacuum line being connected as the operator to the vacuum operated valve 78 hereinbefore described.

A second temperature sensor 88 is connected to the controller housing 66 having a sensing element 90 interior of the chamber 68 thereof. The sensor 88 also is provided with vacuum lines 92 and 94, one of the lines being connected to an engine vacuum source while the other line is operably connected to the hot water shut off valve 48 or 48a. A pressure sensor 96 may be carried by the controller housing 66 if it is desired to have direct reading of fuel pressure during testing or operation of the system. It is also noted that the sensors 80 and 88 may provide electrical signals if the valves 78 and 48 are electrically operated.

The upper surface of the fuel control housing 66 is provided with a closed buffer housing 98 which is operably connected to the interior 68 of the housing 66 by way of a port 100. The buffer 98 may be attached directly to the top of the controller housing 66 or may be located remotely therefrom so long as it is positioned at an elevation above said controller housing.

The hot water/fuel heat exchanger 26 will be hereinafter more fully described but suffice to say at this point that the heat exchanger may be sized for various usages ranging from possibly one heat exchanger element for small or compact cars to several such elements cascaded to provide sufficient fuel heating for large trucks or engines typically experiencing high fuel usage.

In operation, when starting a cold engine, fuel is pumped into the system by fuel pumps 20 and 22 through fuel inlet line 16. Fuel from the pumps 20 and 22 is then passed via line 24 to the heat exchanger 26 which should be disposed as close to the carburetor as physically possible. Fuel then passes from the heat exchanger 26 into the controller 28. The fuel necessary for engine operation is provided from the controller 28 through the conduit 40 to the carburetor and the remaining unused fuel from the controller 28 is routed via line 34 through the metering valve 32 back into the fuel line 16 upstream of the fuel pumps 20 and 22. The J-fitting 28 for connecting the return fuel line 36 to the main fuel line 16 simply comprises a downwardly turned elbow portion which acts as a vapor trap before the fuel reenters the line 16.

At this point since the engine has been started from a cold condition, the first fuel entering the engine will be substantially the temperature of fuel in the tank which does not provide for most efficient engine operation. However, the sensor 80 of the controller will operate to open the vacuum valve 78 allowing fresh air from the heat exchanger 58 to be pulled through the fuel heat exchanger 70. Since the exhaust manifold temperature will rise much more rapidly than the hot water supply from the engine, the first fuel heating will occur at the fuel heat exchanger 70 as the fuel passes from the controller 28 to the carburetor bowl 42. Hence, the primary purpose of the heat exchanger 70 is to provide rapid heating of the fuel during cold engine starts or during high fuel usages wherein the heat exchanger 26 is incapable of raising the temperature of the fuel to its vaporization temperature.

Once the engine hot water system is sufficient to start operation of the heat exchanger 26, temperature of the fuel in the controller housing 66 will begin to rise and once it reaches a preset temperature above the vaporization temperature of the fuel, sensor 80 will cut off the vacuum valve 78 thereby disabling the exhaust manifold heat exchanger 70.

The temperature of the controller will then be controlled by the temperature sensor 88 which operates the hot water shut off valve 48 which may be located either upstream of the heat exchanger 26 or downstream of the heat exchanger 26 as indicated by the dashed lines 48a. Small pressure differentials which are closely related to the temperature of the fuel in the controller can be taken care of by the buffer 98 which has an upper interior chamber 102 having trapped air therein which serves as a pressure buffer for fuel attempting to rise therein as indicated by the fuel level line 104 in FIG. 3. However, the pressure of the fuel in the controller is very closely controlled by controlling the temperature of the fuel through the hot water shut off valve 48 or 48a.

The metering valve 32 of the fuel system is adjusted to insure a continuous flow of fuel through the heat exchanger 26 regardless of fuel demand for the engine.

By continuously recirculating the fuel through the system and preventing it from backing up along the line 16 by way of the expander members 18, there is little heat loss from the fuel that has already been heated while maintaining sufficient hot fuel in the controller to meet engine demands even during highly fluctuating conditions.

Referring now to FIG. 4 of the drawings, reference character 106 generally indicates an exploded perspective view of one embodiment of a heat exchanger which may be utilized as the heat exchanger 26. The heat exchanger 106 comprises a first end plate 108, a plurality of identical fluid passage body members 110 and an opposite end plate 112. Referring to FIG. 6 of the drawings it can be seen schematically that the heat exchanger 106 may be made up of the end plates 108 and 112 and several intermediate fluid passageway body members 110 in a stacked arrangement.

The heat exchanger components 108, 110 and 112 are also shown to be circular cylindrical in shape and are connected by centrally aligned bores 114, 116, and 118, respectively, in conjunction with an elongated bolt 120 and associated nut 122. Proper radial alignment of the body members 108, 110 and 112 is provided by cooperating alignment pins 124 and associated recesses 126.

The fluid passageway body member 110 comprises a plurality of circularly arranged bores 128 which serve as hot water passageways through the body members 110, a second set of fluid passageways 130 are also provided in a circular arrangement concentric to the passageways 128 for the passage of fuel therethrough. The hot water passageways 128 are sealed from the exterior of the heat exchanger by suitable groove and O-ring arrangements 132 which surround the exterior of the passageways 128. A second groove and O-ring combination 134 sealingly separates the passageways 128 from the fuel passageways 130. Sealing of the fuel passageways 130 from the central attachment bore 116 is provided by a third groove and O-ring assembly 136. It is noted that the groove and O-ring assemblies hereinbefore described need only be provided in one face of the body member 110 so that when the body members are attached in cascaded arrangement as shown in FIG. 4, there is present a groove and O-ring assembly contacting each body member.

It is noted that the O-ring grooves and O-rings hereinbefore described can, in some cases, be replaced by three concentric gaskets inserted between the various heat exchanger components 108, 110 and 112. Whereas such gaskets may cause slight separation between the heat exchanger elements, it is still felt that the major part of the fluid would travel down the passageways rather than cutting across at the area where the units are joined together.

Figure 7:
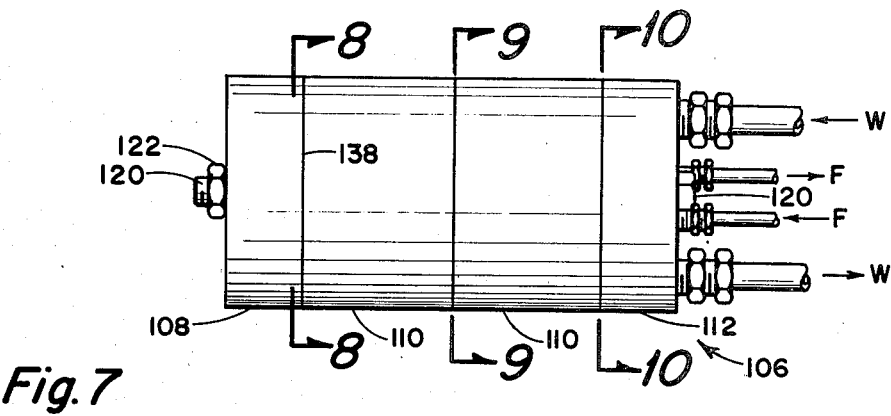
FIG. 7 is a side elevational view of the heat exchanger of FIG. 4.
Figure 8:
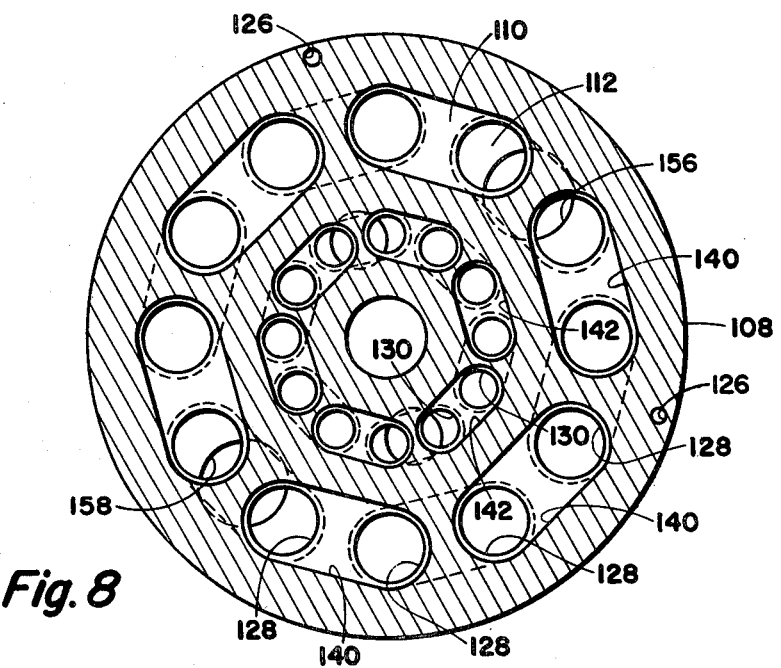
FIG. 8 is an end sectional view of the heat exchanger of FIG. 7 taken along the broken lines 8—8 of FIG. 7.

Referring now to FIGS. 7 and 8 of the drawings, the end plate 108 is provided with an interior face 138 having a plurality of elongated groove cavities 140 located circumferentially thereabout and are disposed such that when the end plate 108 is placed in engagement with and alignment with a body member 110, each said cavity 140 serves to provide open communication between adjacent pairs of hot water fluid passageways 128.

The face 138 of the end plate 108 is also provided with a second set of elongated groove cavities 142 which when placed into alignment and contact with the body member 110 serve to connect adjacent pairs of fuel passageways 130.

Figure 10:
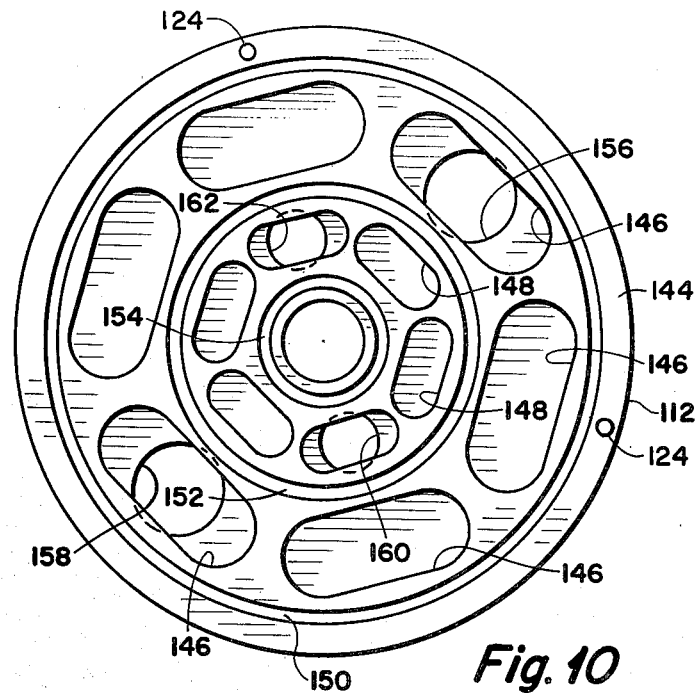
FIG. 10 is an end sectional view of the heat exchanger of FIG. 7 taken along the broken lines 10—10 of FIG. 7.

Referring now to FIGS. 7 and 10 of the drawings, end plate 112 has an interior face 144. The face contains a plurality of elongated groove cavities 146 around the outer periphery thereof such that when the end plate 112 is secured into position with fluid passageway body member 110, the groove cavities 146 connect adjacent pairs of passageways 128. The face 144 of the end plate 112 has a second plurality of elongated groove cavities 148 for connecting adjacent pairs of fuel passageways 130 when the end plate 112 is connected to a fluid passageway body 110. The face 144 of the end plate 112 further has three concentric grooves and associated O-rings 150, 152 and 154 for sealing the fluid passageways as hereinbefore set forth.

A hot water inlet port 156 is provided through the end plate 112 and in communication with one of the groove cavities 146. A water outlet port 158 is provided through the end of the plate 112 in communication with an opposite groove cavity 146. Likewise, a fuel inlet port 160 is provided through the end plate in communication with one of the groove cavities 148 and a fuel outlet port 162 is provided through the end plate in communication with an opposite cavity 148.

It is noted in the example of the configuration of the heat exchanger 106 that there are twelve hot water passageways 128 therethrough and twelve fuel passageways 130 therethrough. Hence, the end plates 108 and 112 are provided with six elongated groove cavities at each end thereof. The alignment pins 124 and recesses 126 are positioned such that the groove cavities of the end plate 108 are radially offset from the cavities of 112 by 1/12th of a turn so that alternate pairs of passageways are operably connected at either end of the fluid passageway body.

In operation, when hot water enters the inlet port 156 as shown in FIG. 10, the water is divided and passes through a pair of adjacent passageways 128 in the heat exchanger body members 110. When the water reaches the opposite end of the passageways 128 the water in one passageway moves into one of the cavities 140 while the water in the other passageway moves into a separate cavity 140 where the water is then routed back up the passageways associated with the cavities 140. In this manner the water is circulated back and forth through the cavities around the heat exchanger until the water finally moves along adjacent passageways 128 back toward the end plate 112 and join together to exit the water outlet port 158.

The fuel, likewise, enters the end plate 112 through port 160 whereby the fuel is again divided, circulated through the passageways 130 and exit the fuel outlet port 162. The material from which the heat exchanger is constructed may be of aluminum or other thermal conductive material so that the heat given off by the hot water passing through the passageways 128 is picked up by the fuel passing through the passageways 130.

Therefore it can be seen that since the fuel flow and water flow is divided upon entering the heat exchanger, this provides the ability for the heat exchanger to be constructed in a compact configuration greatly reducing back pressure caused by the flow of fluid therethrough. If the heat exchanger 106 is connected to the fuel heating system of FIG. 1, it can be seen that the heat exchanger inlet and outlet ports are all contained at one end of the heat exchanger thereby allowing the heat exchanger to be positioned horizontally or vertically as permitted by the available space under the hood of the vehicle. The inlet water line would be labeled by reference character 50, the outlet water line by reference character 53, the inlet fuel line by reference character 24 and the outlet fuel line by reference character 30. It can be seen in FIG. 5 of the drawings that the water and fuel inlet and outlet ports may be provided with suitable fluid line connectors 164, 166, 168 and 170.

Figure 11:
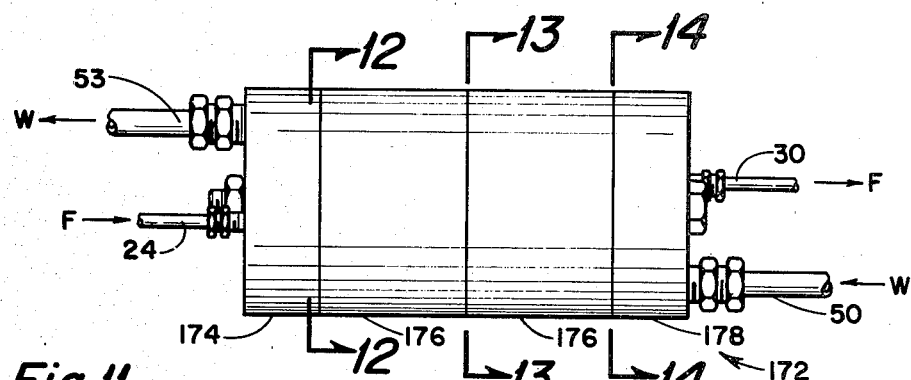
FIG. 11 is an elevational view of a second embodiment of the heat exchanger.

It can be seen by analyzing the heat exchanger of FIG. 11 generally indicated by reference character 172, the device may be configured for the water inlet line 50 to enter one end of the heat exchanger and the water outlet line 53 to exit the opposite end thereof. The heat exchanger 172 also permits the fuel inlet line 24 to be connected to the second end of the heat exchanger while the fuel outlet line 30 exits on the same end as the water inlet much as the schematic configuration of the heat exchanger 26 in FIG. 1.

Figure 14:
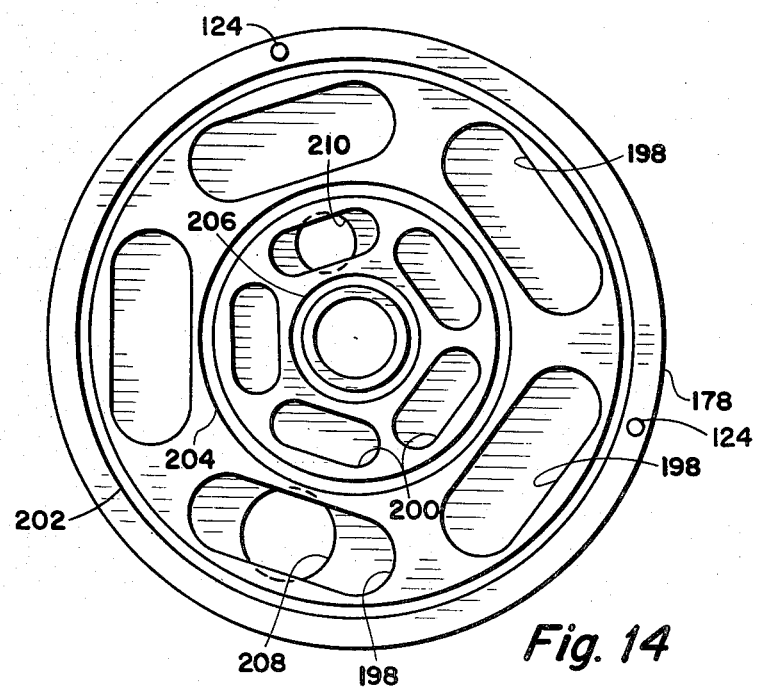
FIG. 14 is an end sectional view of the heat exchanger of FIG. 11 taken along the broken lines 14—14 of FIG. 11.
Figure 13:
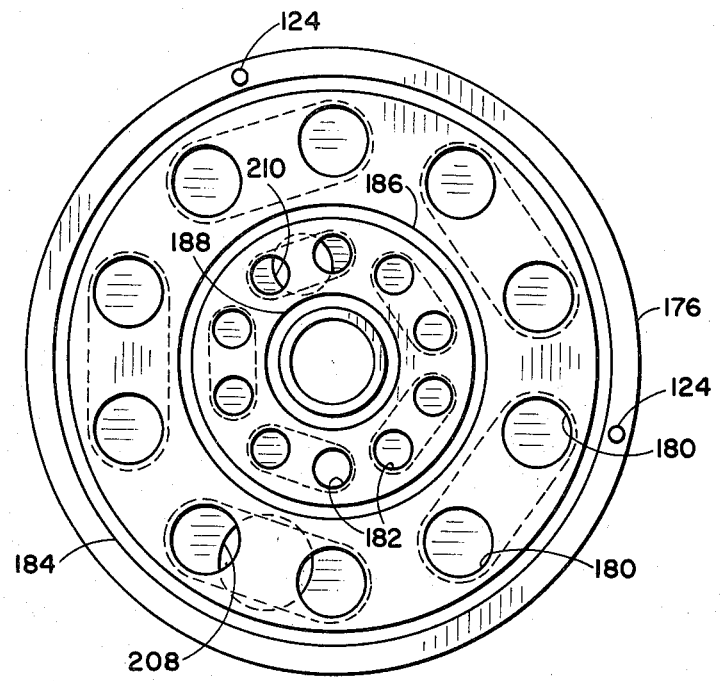
FIG. 13 is an end sectional view of the heat exchanger of FIG. 11 taken along the broken lines 13—13 of FIG. 11.
Figure 12:
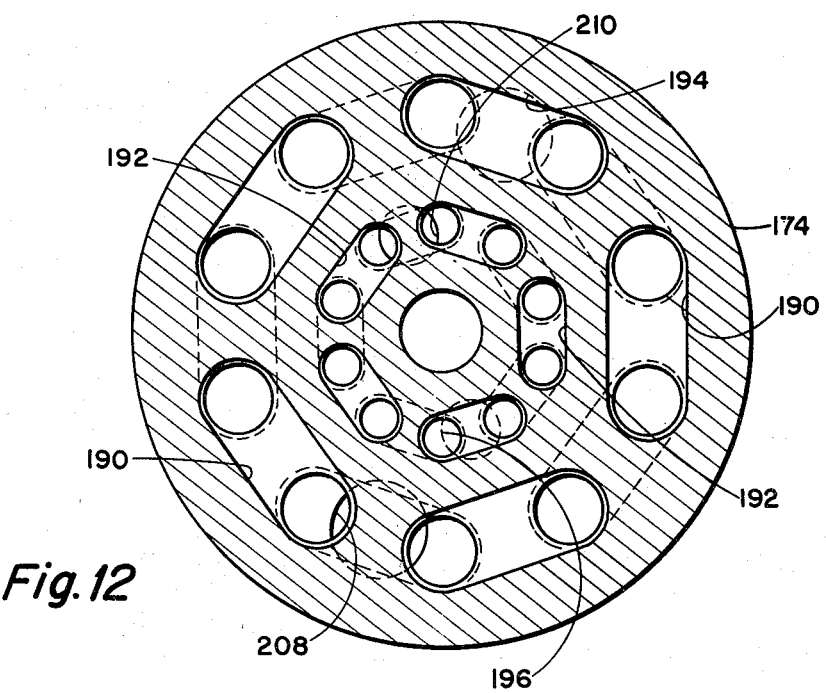
FIG. 12 is an end sectional view of the heat exchanger of FIG. 11 taken along the broken lines 12—12 of FIG. 11.

The heat exchanger 172 is made up of a first end plate 174, a pair of identical body members 176 and an opposite end plate 178 which are depicted in detail in FIGS. 12, 13 and 14 of the drawings. In this particular configuration the fluid passage body members 176 are provided with ten circularly mounted hot water passageways 180 therethrough and ten concentrically circularly mounted fuel passageways 182 therethrough. One end face of each body member 176 is provided with concentrically mounted O-ring grooves and associated O-rings 184, 186 and 188 for mutually sealing the fluid passageways therethrough.

The end plate 174 is provided with five elongated groove cavities 190 therein for operably connecting adjacent pairs of the end passageways 180. Likewise, a plurality of elongated groove cavities 192 are provided in the end plate 174 for operably connecting adjacent pairs of the fuel passageways 182.

The end plate 174 is further provided with a water outlet port 194 which extends through the end plate and in open communication with one of the cavities 190. The end plate 174 is provided with a fuel inlet port 196 which is provided through the end plate and in communication with one of the elongated cavities 192.

Referring now to FIG. 14, the opposite end plate 178 is provided with a first plurality of elongated groove cavities 198 arranged in a circular pattern for connecting adjacent pairs of fluid passageways 180 in communication. The end plate 178 is further provided with a second plurality of elongated groove cavities 200 for operably connecting adjacent pairs of fuel fluid passageways 182 in open communication. The cavities 198 and 200 are fluid sealed by way of concentric grooves and associated O-rings 202, 204 and 206.

A water inlet port 208 is provided through the end plate 178 and in communication with one of the elongated cavities 198. A fuel outlet port 210 is provided through the end plate 178 and in communication with one of the elongated cavities 200.

When the units making up the heat exchanger 172 are joined together as shown in FIG. 11, hot water enters the inlet port 208 through the hot water line 50 and into the cavity 198 associated with the water inlet 208. The hot water at this point divides and passes through the heat exchanger via passageways 180 to the opposite end of the heat exchanger where each of the water passageways are in communication with separate cavities 190 at the end plate 174. The water then passes back and forth through the passageways 180 and exits the heat exchanger through the water outlet port 194 in the end plate 174 and into the hot water line 53.

Simultaneously, fuel enters the heat exchanger from line 24 into the fuel inlet port 196 and in to plate 174. The fuel, upon entering the cavity 192 associated with the end plate 174, then divides and passes back and forth through the fuel passageways 182 until it exits the heat exchanger through the fuel outlet port 210 associated with end plate 178. The fuel then passes to the controller 28 via line 30.

It is therefore seen that when the number of passageways in the heat exchanger divided by two is an odd number, the fluid entering those passageways from one end of the heat exchanger exists at the opposite end of the heat exchanger. On the other hand, where the number of passageways divided by two is an even number, fluid entering one end of the heat exchanger passes throughout the heat exchanger and exists at the same end of the heat exchanger on the opposite side from the fluid inlet port.

This versatility permits the basic design of the heat exchanger to take on a series of combinations as shown in FIG. 15 through 20 of the drawings.

Figure 15:
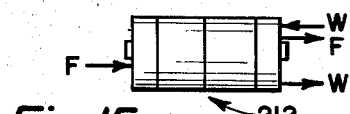
FIGS. 15 through 20 are elevational schematic views of the various combinations of multiple stage heat exchangers embodying the present invention.
Figure 16:
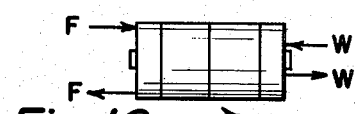
Figure 17:
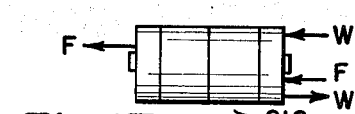

The heat exchangers 212, 214 and 216 are shown in FIGS. 15, 16 and 17, respectively, and all show water being introduced and extracted from the same end of the heat exchanger indicating that the number of water passageways in the heat exchanger divided by two is an even number.

In the case of the heat exchanger 212 fuel is introduced in one end and extracted out of the opposite end and in 216 the same is true with the fuel flowing in the opposite direction, which is present when the number of fuel passageways divided by two is an odd number. The heat exchanger 214 depicts fuel entering the heat exchanger and being extracted from the heat exchanger from the same end.

It is noted in the heat exchanger 214 depicted in FIG. 16 that fuel is being introduced and extracted through the outer passageways whereas water is being introduced and extracted out of the smaller inner passageways. This has been found to be advantageous in some cases to have the heated medium applied to the inner passageways wherein the heat flows outwardly by conduction about the outer passageways.

Figure 18:
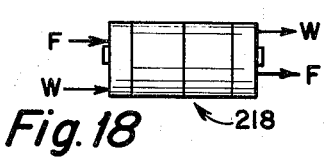
Figure 19:
Figure 20:
Figure 9:
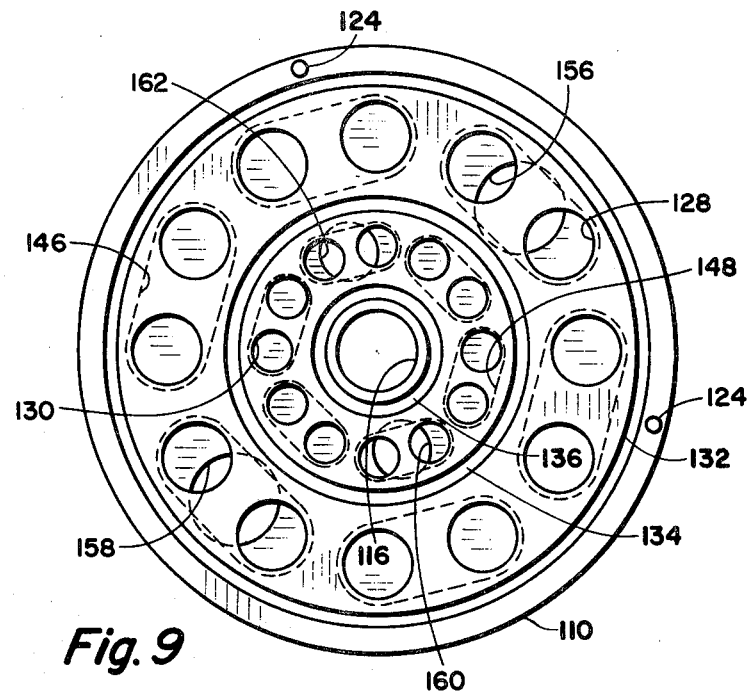
FIG. 9 is an end sectional view of the heat exchanger of FIG. 7 taken along the broken lines 9—9 of FIG. 7.

Reference characters 218, 220 and 222 are depicted in FIGS. 18, 19 and 20 and each show the water being introduced in one end of the heat exchanger and extracted out of the opposite end thereof, which is accomplished by providing the number of water passageways divided by two being an odd number. The other combinations associated therewith are depicted in heat exchangers 218, 220 and 222. It is again pointed out that the capacity of the heat exchanger may be expanded by simply inserting extra identical fluid passageway components as represented by reference characters 110 shown in FIG. 6 of the drawings.

Figure 21:
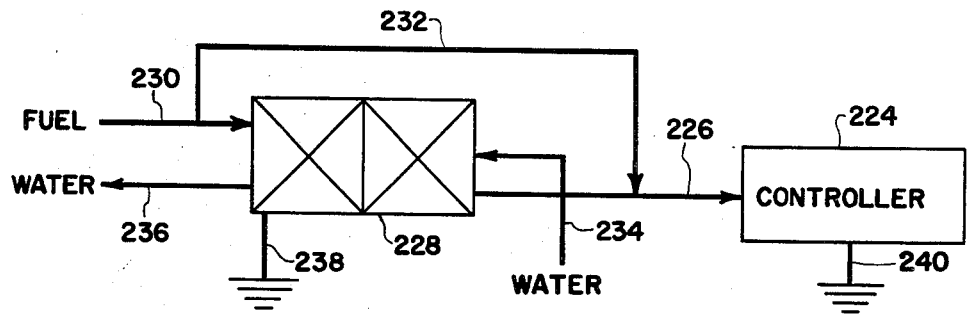
FIG. 21 is a schematic diagram of a heat exchanger having a fuel bypass.

Referring now to FIG. 21 of the drawings, it has been found that when a vehicle is used under sporadic driving conditions, such as when the automobile is stopped and idling for quite some period of time and then a rapid demand is made on the fuel, it has been helpful to place a restricted fuel bypass line around the heat exchanger to prevent overheating of the fuel in the exchanger itself before it enters the controller which, in some cases, caused a vapor lock condition.

In the schematic of FIG. 21, the controller is depicted by reference character 224 which has its input line 226 being operably connected to the output of a stacked heat exchanger 228. The fuel enters the heat exchanger 228 by way of the line 230. A restricted bypass line 232 is connected between the input fuel line 230 and the output fuel line 226 in order to bypass a small portion of the fuel around the heat exchanger. The water inlet and outlet lines are depicted by reference characters 234 and 236. It is noted at this point that in some applications, it may be advantageous to pass the fuel through the outer circle of concentric passageways with the water passing through the inner circle of such passageways as shown in FIGS. 16 and 21 of the drawings.

Figure 22:
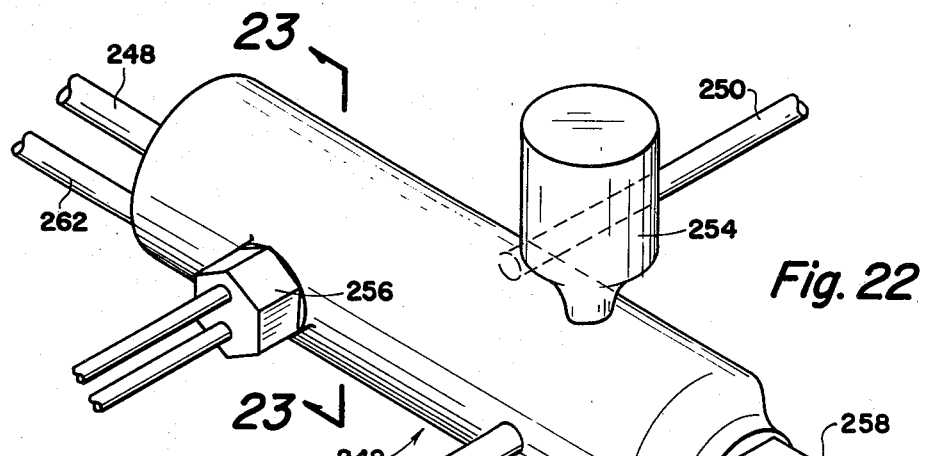
FIG. 22 is a perspective view of a second embodiment of a fuel controller.
Figure 23:
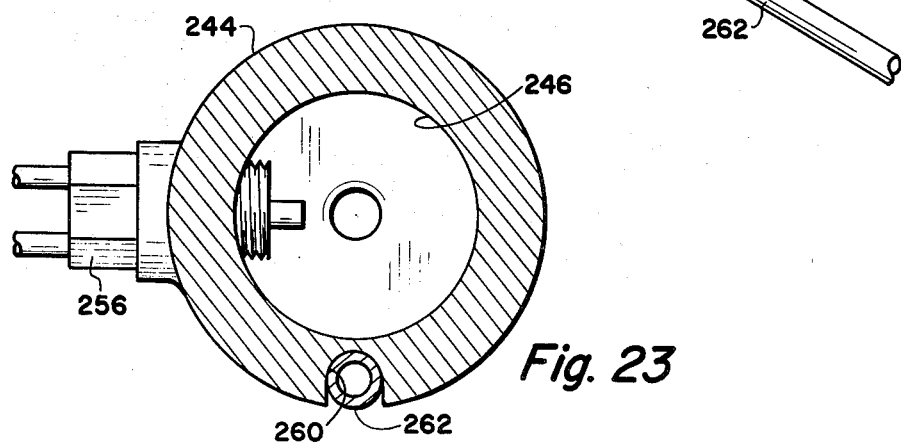
FIG. 23 is an end elevational sectional view of the controller of FIG. 22 taken along the broken lines 23—23 of FIG. 22.

It has also been found necessary in some mounting situations to provide electrical grounding for both the heat exchanger 228 and the controller 224 as shown by reference characters 238 and 240, respectively. Referring now to FIGS. 22 and 23 of the drawings, reference character 242 generally indicates a second embodiment of the fuel controller which may be utilized in place of the controller 28 hereinbefore described. In viewing the controller 242 in use in the system as shown in FIG. 1, the controller 242 has a cylindrical body member 244 having a fuel chamber 246 therein. A fuel inlet line 248 is connected to one end of the body member 244 and is operably connected to receive fuel from the system heat exchanger.

An outlet line 250 is connected to the interior of the chamber the outer end thereof being connected into the carburetor of the vehicle engine. A second fuel outlet line 252 is provided in communication with the chamber with the outer end thereof connected back to the fuel pump or pumps upstream thereof in order to recycle the unused heated fuel. A pressure buffer apparatus 254 is operably connected to the top of the controller body 244 and is similar in function and operation to the buffer 98 hereinbefore described. A temperature sensor 256 is secured to the controller and is operably connected to a hot water shut-off valve hereinbefore described by reference character 48. A second temperature sensor 258 is connected to a second end of the controller body and is operably connected to a vacuum valve, such as the vacuum valve 78 hereinbefore described.

The bottom portion of the controller body 44 is provided with a longitudinal groove 260 along the entire length thereof for receiving a hot air pipe 262 therein. The hot air pipe 262 has one end connected to a fresh air heat exchanger such as the heat exchanger 58 hereinbefore described with the opposite end thereof being operably connected to a vacuum valve, such as the vacuum valve 78 hereinbefore described.

By securing the hot air line 262 within the groove 260 hereinbefore described, heat is transferred from the hot air line by conduction through the wall of the controller body 244 in order to heat the fuel therein when preliminary hot air heating is being utilized as hereinbefore set forth. This configuration permits elimination of the fresh air heat exchanger 70 which is shown in FIG. 1 as being operably connected between the controller and the carburetor. It is also noted that the hot air line 262 can be secured in place on the vehicle engine and act as a mounting support for carrying the controller 242.

From the foregoing it is apparent that the present invention provides a circulating fuel heating system wherein a constant flow of fuel is made available to the carburetor by way of the fuel controller apparatus 28. Rapid heating of the fuel is accomplished by the fresh air exhaust manifold heat exchangers 58 and 70 whereas the fuel is maintained at the desired vaporization temperature over long range use by the hot water heat exchanger 26.

Since the temperature of the fuel is maintained automatically by the heat exchanger components and the flow of fuel is continuous by the carburetor, it is unnecessary to attach fuel pressure regulator devices to the carburetor since the availability of the fuel at the carburetor allows the carburetor to utilize the fuel necessary for engine function while remaining fuel is simply passed back into the lines and recirculated without major loss of temperature.

Whereas the present invention has been described in particular relation to the drawings attached hereto, other and further modifications apart from those shown or suggested herein may be made within the spirit and scope of the invention.

What is claimed is:

1. A circulating fuel heating system for internal combustion engines having a carburetor, said system comprising
heat exchanger means for raising the temperature of the fuel to beyond its vaporization temperature, pump means for delivering fuel to said heat exchanger means, a fluid heat source carried by the engine and operably connected to the heat exchanger means, a fluid heat flow control valve operably connected to the heat exchanger for selectively controlling the flow of heated fluid from the fluid heat source through the heat exchanger means, a fuel controller means operably connected between the heat exchanger means and the carburetor, return control means operably connected between the controller means and the pump means for the routing of unused fuel back to said pump means, a first temperature sensor carried by the controller means and operably connected to the fluid heat flow control valve for regulating the flow of fluid from the fluid heat source through the heat exchanger means to maintain the temperature of the fuel in the controller within a predetermined range above its temperature of vaporization.

2. A fuel heating system as set forth in claim 1 wherein said fluid heat source comprises a hot water outlet port, a hot water line and return line, said hot water line and return line being operably connected to said heat exchanger means through said fluid heat flow control valve.

3. A fuel heating system as set forth in claim 1 wherein said heat exchanger means comprises at least one heat exchanger element made of thermoconductive material providing conduction heating of said fuel from said fluid heat source.

4. A fuel heating system as set forth in claim 3 and including a plurality of heat exchanger elements in cascade arrangement.

5. A fuel heating system as set forth in claim 1 wherein said pump means comprises a pair of parallel fuel pumps, at least one said pump being electrically operated.

6. A fuel heating system as set forth in claim 1 wherein said fuel controller means comprises a fuel chamber disposed in the proximity of the carburetor and having a first outlet operably connected to the carburetor and a second outlet operably connected to said return control means, said return control means comprising a metering valve for the control of fuel flow therethrough.

7. A fuel heating system as set forth in claim 6 wherein said fuel controller means includes a pressure buffer chamber having a closed upper end, the lower end thereof being operably connected to the top of said fuel chamber.

8. A fuel heating system as set forth in claim 6 wherein said fuel flow controller means comprises second fuel heat exchanger means disposed between said fuel chamber and the carburetor, a second heat source operably connected to said second fuel heat exchanger means for selectively heating the fuel between said fuel chamber and entry of the fuel into the carburetor.

9. A fuel heating system as set forth in claim 8 wherein said second heat source comprises a fresh air exhaust manifold heat exchanger for extracting heat from the exhaust manifold, and said second fuel heat exchanger means comprising a hot air chamber disposed between the fuel chamber and the carburetor, said hot air chamber being operably connected to the fresh air exhaust manifold heat exchanger, a vaccum valve operably connected to said hot air chamber for drawing the hot fresh air from the exhaust manifold heat exchanger through said hot air chamber, a second temperature sensor carried by said fuel chamber and operably connected to the said vacuum valve for controlling the flow of hot air through said hot air chamber.

10. A fuel heating system as set forth in claim 1 and including at least one fuel line enlargement chamber operably connected to said pump means for retarding the back flow of fuel upstream of said pump means.

11. A fuel heating system as set forth in claim 6 wherein said fuel flow controller means comprises a second fuel heat exchanger means disposed adjacent to said fuel chamber and made as an integral part thereof, said second fuel heat exchanger comprising a longitudinal groove provided adjacent said fuel chamber and in intimate contact therewith, an elongated pipe segment made of heat conductive material disposed within said groove, a second heat source operably connected to said second fuel heat exchanger means for selectively heating the fuel in said fuel chamber prior to the entry of said fuel into the carburetor.

12. A fuel heating system as set forth in claim 11 wherein said second heat source comprises a fresh air exhaust manifold heat exchanger for extracting heat from the exhaust manifold, a vacuum valve operably connected to said elongated pipe segment for drawing hot fresh air from the exhaust manifold heat exchanger through said pipe segment, a second temperature sensor carried by said fuel chamber and operably connected to said vacuum valve for controlling the flow of hot air through said pipe segment.

13. A fuel heating system as set forth in claim 1 and including a restricted fuel bypass line operably connected to the heat exchanger means for bypassing a small portion of said fuel around the heat exchanger for preventing vapor lock during erratic engine operation conditions.

* * * * *